(12) United States Patent
Yanai (10) Patent No.: US 6,807,467 B2
(45) Date of Patent: Oct. 19, 2004

(54) APPARATUS AND METHOD FOR PROVIDING INFORMATION TO A DRIVER OF A VEHICLE, AND APPARATUS AND METHOD FOR PRESENTING INFORMATION TO THE DRIVER

(75) Inventor: Tatsumi Yanai, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/342,280

(22) Filed: Jan. 15, 2003

(65) Prior Publication Data

US 2003/0163227 A1 Aug. 28, 2003

(30) Foreign Application Priority Data

Feb. 22, 2002 (JP) ........................................ 2002-045710

(51) Int. Cl.[7] .................................................. B60Q 1/48
(52) U.S. Cl. ........................... 701/1; 701/200; 701/212; 340/932.2; 340/988; 340/995.15
(58) Field of Search ............................ 701/1, 117, 119, 701/200, 209, 212; 340/932.2, 988, 936, 989, 990, 995.15, 995.23

(56) References Cited

U.S. PATENT DOCUMENTS 6,147,624 A * 11/2000 Clapper .................. 340/932.2
6,266,589 B1 * 7/2001 Boies et al. .................. 701/36
6,266,609 B1 * 7/2001 Fastenrath .................. 701/200
6,426,708 B1 * 7/2002 Trajkovic et al. ......... 340/932.2
6,501,391 B1 * 12/2002 Racunas, Jr. ............. 340/932.2
6,646,568 B2 * 11/2003 MacPhail et al. ......... 340/932.2

FOREIGN PATENT DOCUMENTS

JP    P2001-175998 A    6/2001

* cited by examiner

Primary Examiner—Thomas C. Black
Assistant Examiner—Eric M. Gibson
(74) Attorney, Agent, or Firm—McDermott Will & Emery LLP (57) ABSTRACT

A system for providing information to a drive of a vehicle, including information providing apparatus and information presenting apparatus. Information providing apparatus includes means for storing information data about a facility with a parking lot, means for measuring vehicle speed of the vehicle traveling into the parking lot, means for selecting an objective information data to be provided to the driver from the stored information data on the basis of the vehicle speed measured, and means for transmitting the objective information data selected to the vehicle. Information presenting apparatus includes means for receiving the objective information data transmitted, means for storing the objective information data received, means for sensing vehicle speed, means for selecting an information data from the stored objective information data on the basis of the vehicle speed sensed, and means for presenting the information data selected to the driver in a predetermined form.

11 Claims, 6 Drawing Sheets

APPARATUS AND METHOD FOR PROVIDING INFORMATION TO A DRIVER OF A VEHICLE, AND APPARATUS AND METHOD FOR PRESENTING INFORMATION TO THE DRIVER

BACKGROUND OF THE INVENTION

The present invention relates to a system for providing information to a driver of a vehicle such as automobile. More specifically, the present invention relates to the information providing system capable of providing and presenting information about a facility with a parking lot and facilities near a parking lot in appropriate form in relation to vehicle speed.

Information providing apparatus is known, which is disposed near an entrance of a parking lot and presents information on a full or vacancy state of the parking lot. Recently, there has been proposed an information providing system including a lightning board disposed on a roadside which presents a total information concerning location of the peripheral parking lots and a full/vacancy state thereof. Japanese Patent Application First Publication No. 2001-175998 discloses an information providing system for providing such an information about location and full/vacancy state of the parking lot via an in-vehicle navigation system to the vehicle driver.

SUMMARY OF THE INVENTION

However, there have not been proposed an information providing system for providing information on facilities near a parking lot to a driver of a vehicle. If the driver has no information on an objective facility, an objective event or the like before reaching a parking lot in an objective area, the driver will lose a route to the objective facility or must separately check information on the objective event. Further, if the driver is not provided with information about the parking lot, for example, a configuration thereof, a full/vacancy state thereof, a location of a vacant space thereof, and the like, the driver may take much time to find and reach the vacant space. Thus, there will occur inconvenience to the vehicle driver unless there is provided information concerning the driver's action to be taken after reaching the parking lot.

It would threrefore be desirable to provide an information providing system and an information providing method which are capable of appropriately providing effective information concerning the driver's action to be taken after reaching a parking lot, such as information on the parking lot and the peripheral facilities, in the course of the driver's traveling into the parking lot.

In one aspect of the present invention, there is provided an apparatus for providing information to a driver of a vehicle, the apparatus comprising:

information storage means for storing information data about a facility with a parking lot;

speed measuring means for measuring vehicle speed of the vehicle traveling into the parking lot;

information selecting means for selecting an objective information data to be provided to the driver from the stored information data on the basis of the vehicle speed measured; and information transmitting means for transmitting the objective information data selected to the vehicle.

In a further aspect of the present invention, there is provided a method of providing information for a driver of a vehicle, the method comprising:

storing information data about a predetermined facility with a parking lot;

measuring vehicle speed of the vehicle traveling into the parking lot;

selecting an objective information data to be provided to the driver from the stored information data on the basis of the vehicle speed measured; and transmitting the objective information data selected to the vehicle.

In another aspect of the present invention, there is provided an apparatus for presenting information to a driver of a vehicle, the apparatus comprising:

information receiving means for receiving information data;

information memory means for storing the information data received by the information receiving means;

speed sensing means for sensing vehicle speed of the vehicle;

information control means for selecting an objective information data from the stored information data on the basis of the vehicle speed sensed; and information presentation means for presenting the objective information data selected to the driver in a predetermined form.

In a further aspect of the present invention, there is provided a method of presenting information to a driver of a vehicle, the method comprising:

receiving information data;

storing the information data received;

sensing vehicle speed of the vehicle;

selecting an objective information data from the stored information data on the basis of the vehicle speed sensed; and presenting the objective information data selected to the driver in a predetermined form.

In a still further aspect of the present invention, there is provided an information providing system, comprising:

a) an apparatus for providing information to a driver of a vehicle, the apparatus comprising:
  information storage means for storing information data about a facility with a parking lot;
  speed measuring means for measuring vehicle speed of the vehicle traveling into the parking lot;
  information selecting means for selecting an objective information data to be provided to the driver from the stored information data on the basis of the vehicle speed measured; and
  information transmitting means for transmitting the objective information data selected to the vehicle; and b) an apparatus for presenting information to a driver of a vehicle, the apparatus comprising:
  information receiving means for receiving the objective information data transmitted from the information transmitting means of the apparatus for providing information;
  information memory means for storing the objective information data received by the information receiving means;
  speed sensing means for sensing vehicle speed of the vehicle;
  information control means for selecting an information data from the stored objective information data on the basis of the vehicle speed sensed; and information presentation means for presenting the information data selected to the driver in a predetermined form.

In a still further aspect of the present invention, there is provided a method of providing information for a driver of a vehicle, the method comprising:

storing information data about a predetermined facility with a parking lot;

measuring vehicle speed of the vehicle traveling into the parking lot;

selecting an objective information data to be provided to the driver from the stored information data on the basis of the vehicle speed measured;

transmitting the objective information data selected to the vehicle;

receiving the objective information data transmitted;

storing the objective information data received;

sensing vehicle speed of the vehicle;

selecting an information data from the stored objective information data on the basis of the vehicle speed sensed; and presenting the information data selected to the driver in a predetermined form.

DETAILED DESCRIPTION OF THE PREFERRED EMBODIMENT

Referring now to FIGS. 1–5, there is shown an information providing system for a vehicle, according to a preferred embodiment of the present invention. In this embodiment, information concerns a parking lot of a station, a shopping center, a hall, an amusement park or public facilities such as a city hall and a hospital, and a parking lot for general users visiting a downtown, and concerns a facility with the parking lot and facilities in the vicinity of the parking lot.

Figure 1:
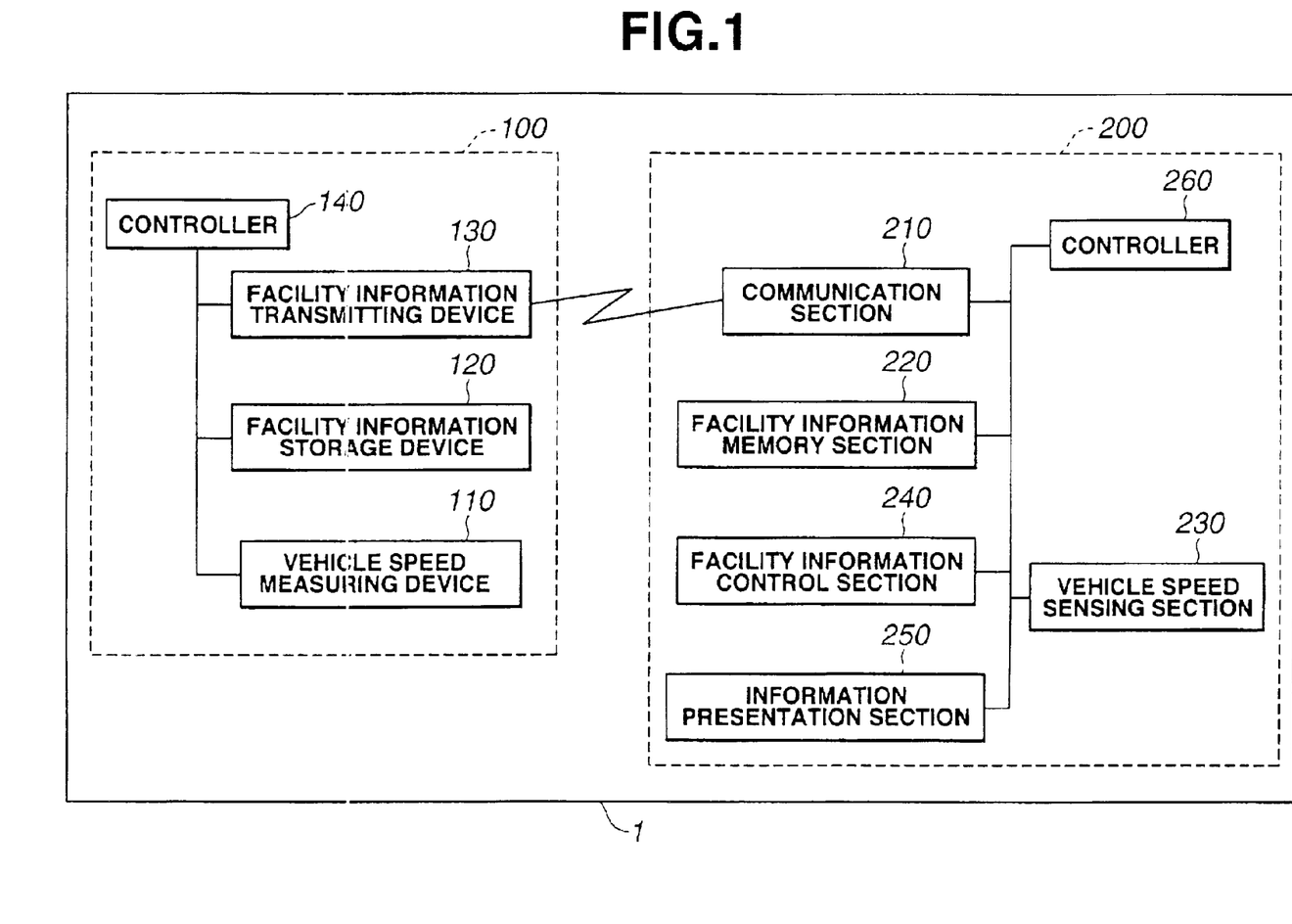
FIG. 1 is a block diagram of an information providing system of a first embodiment according to the present invention, showing a facility information providing apparatus and a facility information presenting apparatus.

As illustrated in FIG. 1, information providing system 1 includes facility information providing apparatus 100 and facility information presenting apparatus 200 operative to be communicated with facility information providing apparatus 100. Facility information providing apparatus 100 is disposed near an entrance of a parking lot. Facility information providing apparatus 100 includes vehicle speed measuring device 110, facility information storage device 120, facility information transmitting device 130 and controller 140. Controller 140 is connected with these devices 110–130 and generates control commands for respectively controlling these devices 110–130 at suitable timing. Controller 140 may be formed by a microcomputer, for example, including a central processing unit (CPU), input ports (IN PORT), output ports (OUT PORT), read-only memory (ROM), random access memory (RAM) and a common data bus.

Figure 2:
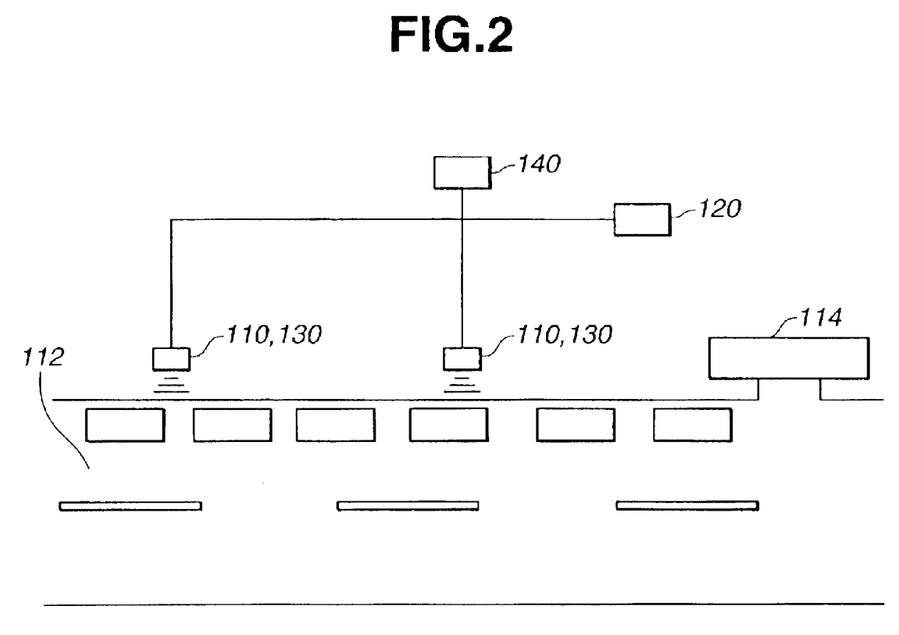
FIG. 2 is an explanatory diagram of arrangement of a vehicle speed measuring device, a facility information storage device and a facility information transmitting device used in the facility information providing apparatus of FIG. 1.

Vehicle speed measuring device 110 measures vehicle speed of a vehicle traveling toward the entrance of the parking lot and transmits output of the measurement results to facility information storage device 120. Specifically, as illustrated in FIG. 2, guide lane 112 reaches entrance 114 of the parking lot, along which the vehicle is guided toward the parking lot and waits turn of traveling into entrance 114 of the parking lot. Vehicle speed measuring device 110 is installed on a roadside of guide lane 112 near entrance 114 of the parking lot. Vehicle speed measuring device 110 is a vehicle speed sensor which senses vehicle speed every time the vehicle travels through an objective road and then generates a signal indicative of the vehicle speed sensed. In this embodiment, vehicle speed measuring device 110 is provided in the form of beacons installed at two positions along guide lane 112. Vehicle speed measuring device 110 calculates an average of the vehicle speeds measured at the two positions and transmits the average thereof calculated to controller 140.

Facility information storage device 120 stores a plurality of data of information described above. Specifically, the plurality of information data stored in facility information storage device 120 are related to a configuration of the parking lot, a full/vacancy state thereof, a location of a vacant space thereof, facilities to which the parking lot belongs, a guidance of a route to facilities near the parking lot, events held in the facilities, and the like. The information data is hereinafter referred to merely as facility information data.

Controller 140 receives the signal indicative of the vehicle speed measured from vehicle speed measuring device 110. Controller 140 selects and retrieves an objective information data suitable to be provided to a driver of the vehicle from the information data stored in facility information storage device 120, on the basis of the vehicle speed measured. Specifically, controller 140 determines or predicts a time period required until the vehicle reaches a predetermined position, for example, entrance 114 of the parking lot, on the basis of the vehicle speed measured. The time period is a predicted time period calculated based on the vehicle speed measured. Upon the calculation of the time period, reference is made to the following information data, which are previously recognized on the basis of the configuration of the parking lot and the guide lane, and the structure of facility information presenting apparatus 200, such as a transmission location where the objective information data selected is transmitted to the vehicle, an average time required from receipt of the transmitted objective information data to output of the received objective information data to the driver, and a position in the parking lot where the output of the objective information data is terminated. Controller 140 determines an amount of the objective information data on the basis of the time period. Namely, the objective information data is given in such an amount that the driver can recognize and comprehend it in the time period. The objective information data may be a large data corresponding to a relatively long time period, or may be a small data corresponding to a relatively short time period. Controller 140 then transmits the thus-selected objective information data to facility information transmitting device 130.

Facility information transmitting device 130 receives the objective information data selected and converts the received objective information data to a signal indicative thereof. Facility information transmitting device 130 transmits the signal to the vehicle traveling toward the parking lot. Similar to vehicle speed measuring device 110, facility information transmitting device 130 is installed on a roadside of guide lane 112 as shown in FIG. 2. In this embodiment, facility information transmitting device 130 is provided in the form of beacons located at two positions along guide lane 112. Each of facility information transmitting devices 130 transmits the same objective information data to the vehicle traveling on guide lane 112.

Facility information presenting apparatus 200 now is explained. Facility information presenting apparatus 200 is installed in a vehicle and receives the information data transmitted from facility information providing apparatus 100. In this embodiment, facility information presenting apparatus 200 is installed in an in-vehicle navigation system. As illustrated in FIG. 1, facility information presenting apparatus 200 includes communication section 210, facility information memory section 220, vehicle speed sensing section 230, facility information control section 240, information presentation section 250 and controller 260. Controller 260 is connected with these sections 210–250 and generates control commands for respectively controlling these sections 210–250 at suitable timing. Similar to controller 140, controller 260 may be formed by a microcomputer as explained above.

Communication section 210 receives the signal indicative of the objective information data transmitted from facility information transmitting devices 130 of facility information providing apparatus 100. Communication section 210 conducts signal processing such as demodulation for regenerating the objective information data of the facility information. Communication section 210 then transmits the objective information data regenerated to facility information memory section 220.

Facility information memory section 220 stores the objective information data transmitted from communication section 210. The objective information data may be stored in various predetermined forms including moving image data, frame image data, still image data and voice data.

Vehicle speed sensing section 230 senses current vehicle speed of the vehicle and transmits a signal indicative of the vehicle speed sensed to facility information control section 240. Vehicle speed sensing section 230 may be designed to obtain current vehicle speed data derived from a speed sensing device which is generally installed in vehicles and detects current vehicle speed to be indicated on a speedometer.

Figure 3:
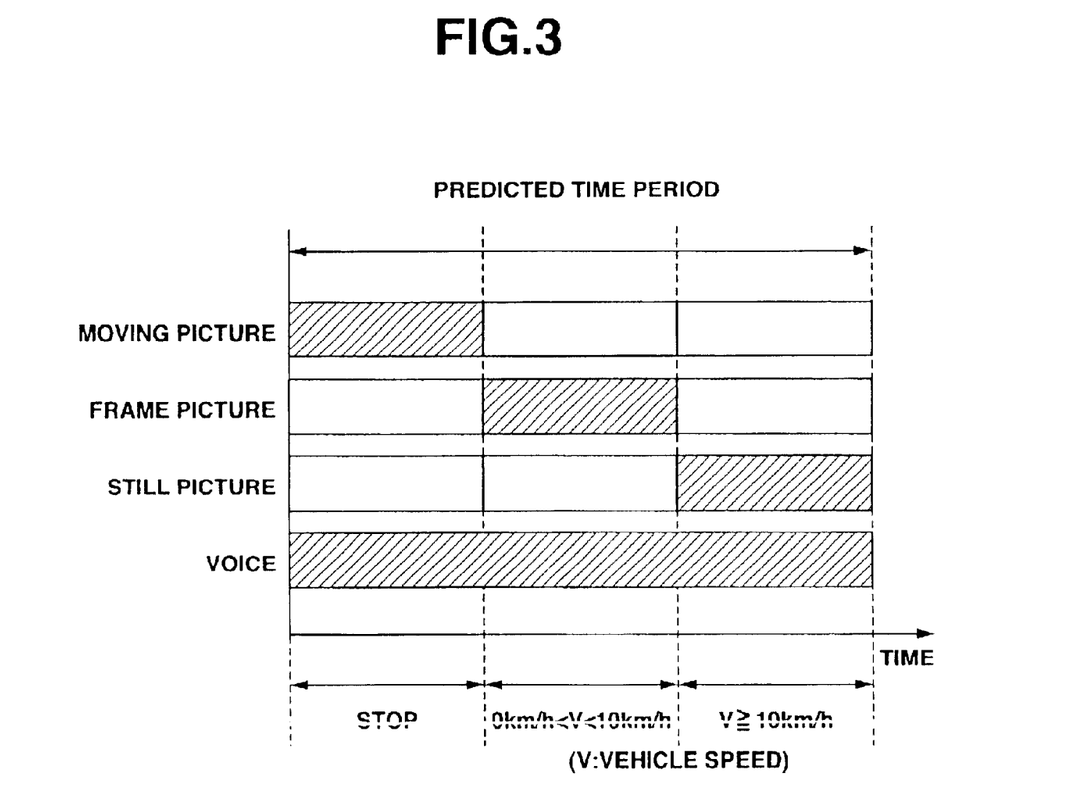
FIG. 3 is an explanatory diagram illustrating a relationship between vehicle speed and various information forms in the facility information presenting apparatus of FIG. 1.

Facility information control section 240 selects and retrieves one of the objective information data stored in information memory section 220 on the basis of the sensed vehicle speed received from vehicle speed sensing section 230. The selection of the objective information data is conducted based on a predetermined relationship shown in FIG. 3, between the vehicle speed and the forms of the objective information data to be retrieved. As illustrated in FIG. 3, if the parking lot is in the full state and the vehicle is stopped and waits in line for entering the parking lot, the objective information data can be retrieved in the form of moving image data and voice data. If the vehicle speed sensed is larger than 0 km/h but smaller than 10 km/h, the objective information data can be retrieved in the form of frame image data and voice data. If the vehicle speed sensed is not less than 10 km/h, the objective information data can be retrieved in the form of still image data and voice data. The objective information data retrieved is transmitted to information presentation section 250.

Information presentation section 250 conducts presentation of the objective information data selected at facility information control section 240. Information presentation section 250 includes a display and a speaker. In response to receipt of the objective information data in the form of moving image and voice data, frame image and voice data, and still image and voice data, information presentation section 250 presents to the driver the facility information in the respective forms of a moving picture and voice, a frame picture and voice, and a still picture and voice.

Figure 4:
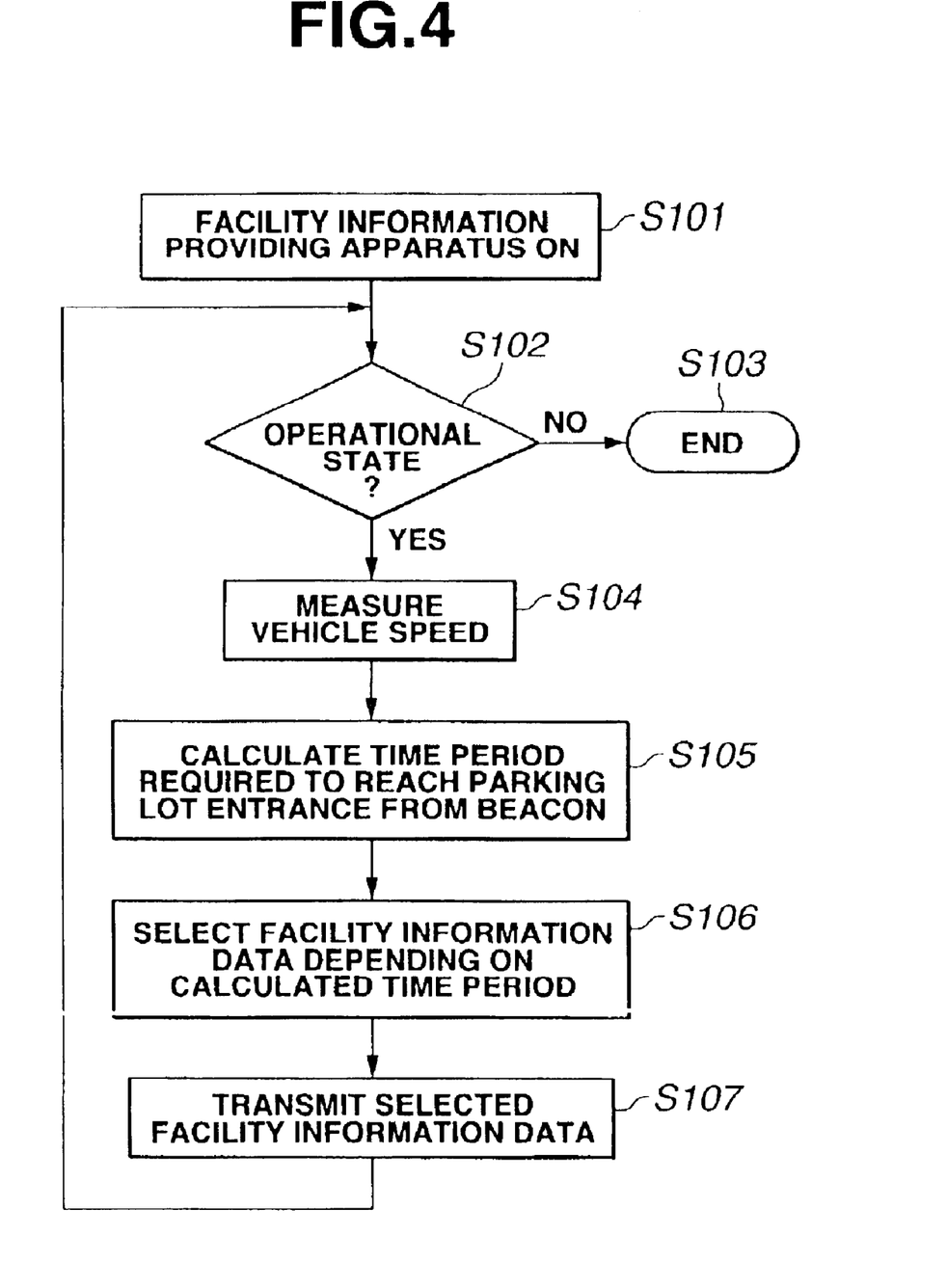
FIG. 4 is a flow diagram illustrating facility information provision executed by the facility information providing apparatus of FIG. 1.
Figure 5:
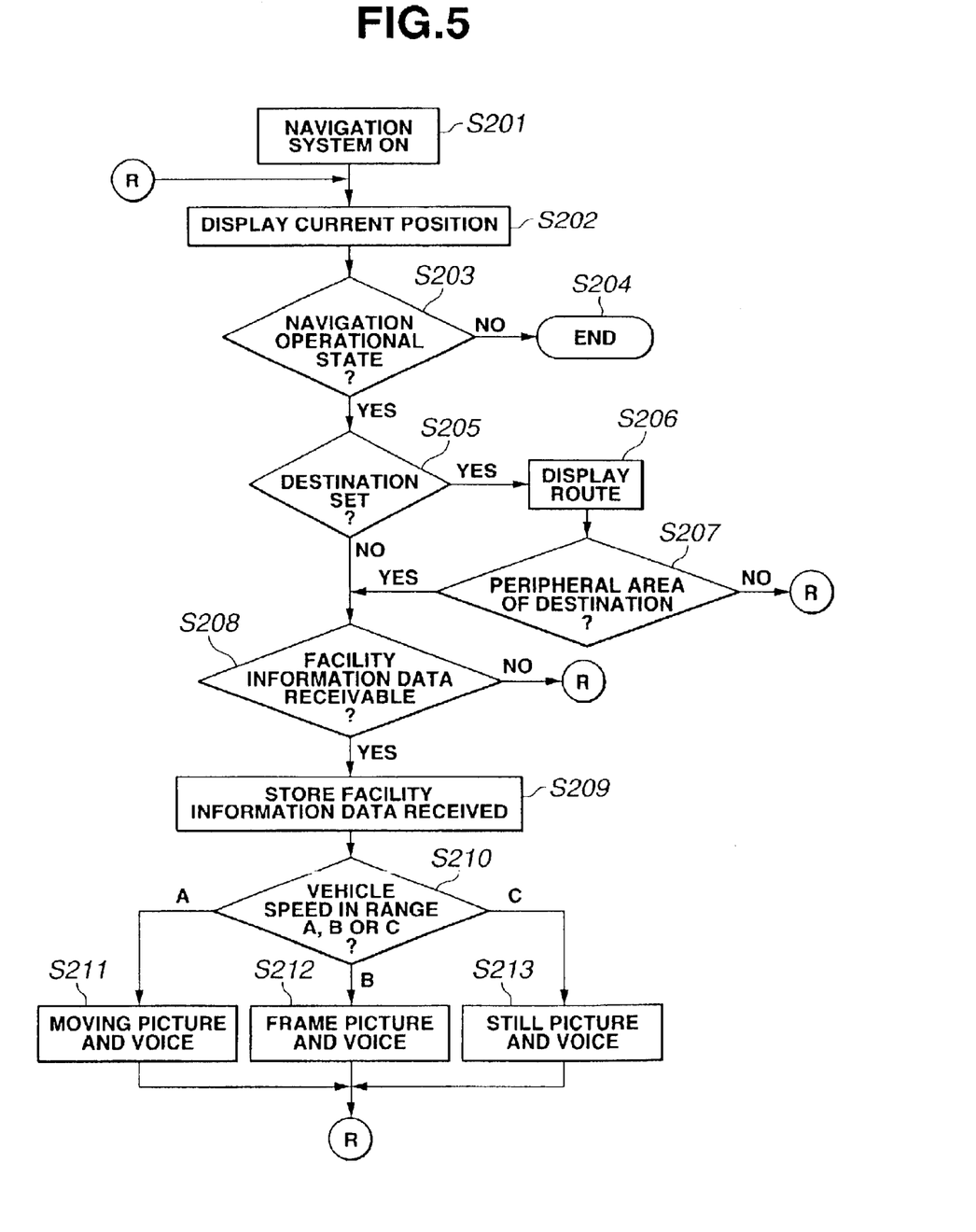
FIG. 5 is a flow diagram illustrating obtainment of facility information executed by the facility information presenting apparatus of FIG. 1.

Referring to FIGS. 4 and 5, an operation of facility information providing system 1 will be explained hereinafter. In FIG. 4, there is shown an operation of facility information providing apparatus 100. At block S101, facility information providing apparatus 100 is turned on. Then, at block S102, an interrogation is made whether or not facility information providing apparatus 100 is in an operational state. If, at block S102, the interrogation is in negative, the routine goes to block S103. If, at block S102, the interrogation is in affirmative, the routine goes to block S104 at which speed of a vehicle traveling guide lane 112 to entrance 114 of a parking lot is measured by vehicle speed measuring device 110. The routine then goes to block S105. At block S105, the time period required for the vehicle to reach entrance 114 of the parking lot from a position of facility information transmitting device 130 in which the facility information is transmitted, is calculated. The routine goes to block S106 at which an objective facility information data is selected and retrieved from the facility information data stored in facility information storage device 120 depending on the time period calculated. The routine then goes to block S107 at which the objective facility information data retrieved is transmitted to facility information presenting apparatus 200 installed in the vehicle. When the sequential process S101-S107 is completed, the routine returns to block S102 and the subsequent process at blocks S102–S107 is repeated. If facility information providing apparatus 100 is switched to OFF state, the OFF state is detected at block S102 and the sequential process is finished at block 103.

Next, referring to FIG. 5, an operation of facility information presenting apparatus 200 is explained. At block S201, an in-vehicle navigation system including facility information presenting apparatus 200 is turned on. In this state, a navigation processing section of the navigation system receives a GPS (Global Positioning System) signal and detects a current position of the vehicle. At block S202, the detected current position of the vehicle is presented together with the peripheral nearby roads and facilities in a map on the display as a part of information presentation section 250. The routine then goes to block S203 at which an interrogation is made whether or not the navigation system is at operational state. If, at block S203, the interrogation is in negative, the routine goes to block S204 at which the process is finished. If, at block S203, the interrogation is in affirmative, the routine goes to block S205. At block S205, an interrogation is made whether or not a destination of the vehicle is set. If, at block S205, the interrogation is in affirmative, the routine goes to block S206 at which a route to the destination is determined and the route determined is presented on the display of information presentation section 250. The routine then goes to block S207 at which an interrogation is made whether or not the current position previously detected is in the peripheral area of the destination. If, at block S207, the interrogation is in negative, the routine goes back to block S202 and the sequential process at blocks S202–S207 is repeated.

If, at block S207, the interrogation is in affirmative, or at block S205, the interrogation is in negative, then the routine goes to block S208. At block S208, an interrogation is made whether or not the objective facility information data transmitted from facility information transmitting device 130 is receivable in communication section 210. If, at block S208, the interrogation is in negative, the routine goes back to block S202 and the sequential process at blocks S202–S208 is repeated. If, at block S208, the interrogation is in affirmative, the routine goes to block S209 at which the objective facility information data received at communication section 210 is stored in facility information memory section 220. The routine then goes to block S210 at which an interrogation is made which of three ranges A, B and C is the range of the vehicle speed sensed in vehicle speed sensing section 230.

If, at block S210, it is determined that the range of the vehicle speed sensed is "A" indicating that the vehicle is stopped, the routine goes to block S211. At block S211, moving image data and voice data of the facility information are selected from the facility information data stored in facility information memory section 220, and a moving picture and voice are presented to the vehicle driver at information presenting section 250. If, at block S210, it is determined that the range of the vehicle speed sensed is "B" indicating that the vehicle speed sensed is larger than 0 km/h but smaller than 10 km/h, the routine goes to block S212. At block S212, frame image data and voice data of the facility information are selected from the facility information data stored in facility information memory section 220, and a frame picture and voice are presented to the vehicle driver at information presenting section 250. If, at block S210, it is determined that the range of the vehicle speed sensed is "C" indicating that the vehicle speed sensed is not less than 10 km/h, the routine goes to block S213. At block S213, still image data and voice data of the facility information are selected from the facility information data stored in facility information memory section 220, and a still picture and voice are provided to the vehicle driver at information presenting section 250. When the presentation of the facility information at each of blocks S211, S212 and S213 is completed, the routine goes back to block S202 and the sequential process is repeated.

As is appreciated from the above explanation, facility information providing system 1 of the invention can appropriately provide facility information, such as a facility including a parking lot and the peripheral nearby facilities, to a driver of a vehicle via an in-vehicle navigation system. When the vehicle enters a parking lot of a facility located at a destination, the driver can obtain effective facility information with respect to the driver's action which will be taken after the vehicle reaches the destination. This serves for significantly increasing convenience to the driver. Further, the facility information is transmitted and presented to the driver in the data form which the driver can recognize and comprehend for the time period required for the vehicle to reach the parking lot. This serves for ensuring the driver of recognition of the facility information. Further, the form of the facility information to be presented is switched depending on the vehicle speed. Namely, when the vehicle is stopped, the facility information is presented in the form of a moving picture and voice. When the vehicle travels at middle speed, the facility information is presented in the form of a frame picture and voice. When the vehicle travels at high speed, the facility information is presented in the form of a still picture and voice. The facility information thus can be presented to the driver in the appropriate form corresponding to the traveling condition of the vehicle.

Further, the number of each of vehicle speed measuring device 110 and facility information transmitting device 130 of facility information providing apparatus 100 may be only one or three or more. The number may be suitably determined depending on a length of the guide lane extending to the parking lot, a configuration of the guide lane, and the like. Further, in a case where the number is two or more, vehicle speed measuring device 110 may be operative to measure vehicle speeds of separate vehicles, and facility information transmitting device 130 may be operative to transmit multiple data of the facility information on the basis of the respective vehicle speeds measured.

Figure 6:
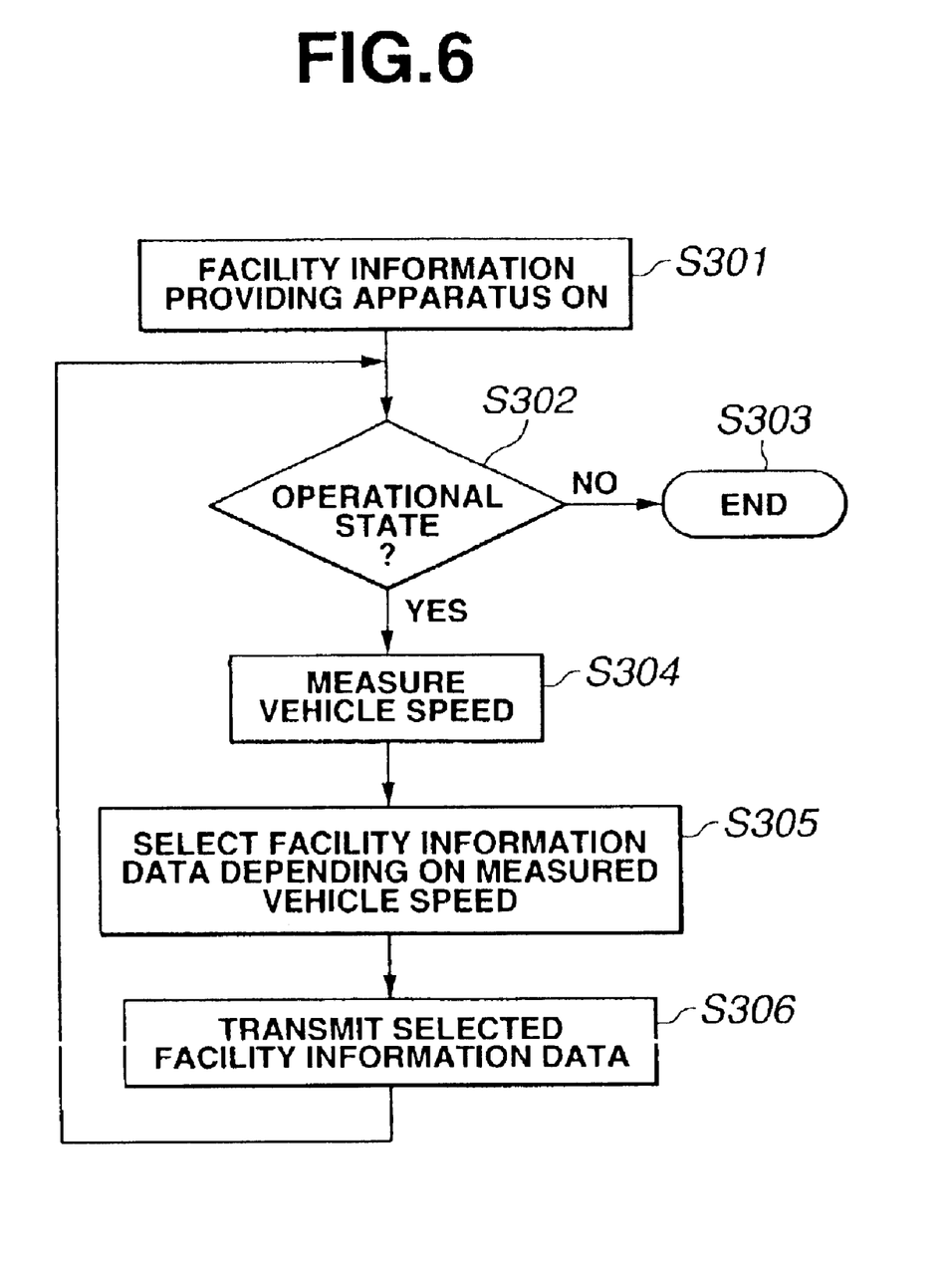
FIG. 6 is a flow diagram similar to FIG. 4, but showing facility information provision executed by a modification of the facility information providing apparatus of the first embodiment.

FIG. 6 illustrates a flow diagram of facility information provision executed by a modification of facility information providing apparatus 100 of the first embodiment. The modification differs in that, at block S305, the objective facility information data is selected from the facility information data stored in facility information storage device 120 depending on the vehicle speed measured. The remaining processing operations at blocks S301–304 and S306 are the same as those at blocks S101–104 and S107. Controller 140 is programmed to select the objective facility information data depending on merely the vehicle speed measured.

This application is based on prior Japanese Patent Application No. 2002-045710 filed on Feb. 22, 2002, the entire content of which is hereby incorporated by reference.

Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. An information providing system, comprising:
   a) an apparatus for providing information to a driver of a vehicle, the apparatus comprising:
      information storage means for storing information data about a facility with a parking lot;
      speed measuring means for measuring vehicle speed of the vehicle traveling into the parking lot;
      information selecting means for selecting an objective information data to be provided to the driver from the stored information data on the basis of the vehicle speed measured; and
      information transmitting means for transmitting the objective information data selected to the vehicle; and
   b) an apparatus for presenting information to a driver of a vehicle, the apparatus comprising:
      information receiving means for receiving the objective information data transmitted from the information transmitting means of the apparatus for providing information;
      information memory means for storing the objective information data received by the information receiving means;
      speed sensing means for sensing vehicle speed of the vehicle;

information control means for selecting an information data from the stored objective information data on the basis of the vehicle speed sensed; and information presentation means for presenting the information data selected to the driver in a predetermined form, wherein the predetermined form of the objective information data includes moving image data when the vehicle speed sensed is equal to a first reference value, still image data when the vehicle speed sensed is not less than a second reference value larger than the first reference value, and frame image data when the vehicle speed sensed is larger than the first reference value and smaller than the second reference value.

2. The system as claimed in claim 1, wherein the information selecting means determines a time period required until the vehicle reaches a predetermined position in the parking lot on the basis of the vehicle speed measured, the information selecting means determines and selects an amount of the objective information data on the basis of the time period determined, the amount of the objective information data being recognizable and comprehensible to the driver in the time period determined.

3. The system as claimed in claim 2, wherein the predetermined position is an entrance of the parking lot.

4. The system as claimed in claim 1, wherein the predetermined form of the objective information data includes voice data.

5. A method of providing information for a driver of a vehicle, the method comprising:

storing information data about a predetermined facility with a parking lot;

measuring vehicle speed of the vehicle traveling into the parking lot;

selecting an objective information data to be provided to the driver from the stored information data on the basis of the vehicle speed measured;

transmitting the objective information data selected to the vehicle;

receiving the objective information data transmitted;

storing the objective information data received;

sensing vehicle speed of the vehicle;

selecting an information data from the stored objective information data on the basis of the vehicle speed sensed; and presenting the information data selected to the driver in a predetermined form, wherein the predetermined form of the objective information data includes moving image data when the vehicle speed sensed is equal to a first reference value, still image data when the vehicle speed sensed is not less than a second reference value larger than the first reference value, and frame image data when the vehicle speed sensed is larger than the first reference value and smaller than the second reference value.

6. The method as claimed in claim 5, further comprising determining a time period required until the vehicle reaches a predetermined position in the parking lot, the objective information data selecting operation determining and selecting an amount of the objective information data on the basis of the time period determined, the amount of the objective information data being recognizable and comprehensible to the driver in the time period determined.

7. The method as claimed in claim 5, wherein the predetermined form of the objective information data includes voice data.

8. An apparatus for presenting information to a driver of a vehicle, the apparatus comprising:

information receiving means for receiving information data;

information memory means for storing the information data received by the information receiving means;

speed sensing means for sensing vehicle speed of the vehicle;

information control means for selecting an objective information data from the stored information data on the basis of the vehicle speed sensed; and information presentation means for presenting the objective information data selected to the driver in a predetermined form, wherein the predetermined form of the objective information data comprises moving image data when the vehicle speed sensed is equal to a first reference value, the predetermined form of the objective information data comprising still image data when the vehicle speed sensed is not less than a second reference value larger than the first reference value, the predetermined form of the objective information data comprising frame image data when the vehicle speed sensed is larger than the first reference value and smaller than the second reference value.

9. The apparatus as claimed in claim 8, wherein the predetermined form of the objective information data includes voice data.

10. A method of presenting information to a driver of a vehicle, the method comprising:

receiving information data;

storing the information data received;

sensing vehicle speed of the vehicle;

selecting an objective information data from the stored information data on the basis of the vehicle speed sensed; and presenting the objective information data selected to the driver in a predetermined form, wherein the predetermined form of the objective information data comprises moving image data when the vehicle speed sensed is equal to a first reference value, the predetermined form of the objective information data comprising still image data when the vehicle speed sensed is not less than a second reference value larger than the first reference value, the predetermined form of the objective information data comprising frame image data when the vehicle speed sensed is larger than the first reference value and smaller than the second reference value.

11. The method as claimed in claim 10, wherein the predetermined form of the objective information data includes voice data.

* * * * *